United States Patent
Hara (10) Patent No.: US 9,904,352 B2
(45) Date of Patent: Feb. 27, 2018

(54) PROCESSOR CONTROL APPARATUS AND PROCESSOR CONTROL METHOD

(71) Applicant: CALSONIC KANSEI CORPORATION, Saitama-shi, Saitama (JP)

(72) Inventor: Youhei Hara, Saitama (JP)

(73) Assignee: CALSONIC KANSEI CORPORATION, Saitama-shi, Saitama (JP)

( * ) Notice: Subject to any disclaimer, the term of this patent is extended or adjusted under 35 U.S.C. 154(b) by 99 days.

(21) Appl. No.: 15/113,884

(22) PCT Filed: Nov. 28, 2014

(86) PCT No.: PCT/JP2014/005974
§ 371 (c)(1),
(2) Date: Jul. 25, 2016

(87) PCT Pub. No.: WO2015/111106
PCT Pub. Date: Jul. 30, 2015

(65) Prior Publication Data
US 2016/0349833 A1   Dec. 1, 2016

(30) Foreign Application Priority Data

Jan. 27, 2014   (JP) ................... 2014-012318

(51) Int. Cl.
*G06F 11/07*   (2006.01)
*G06F 1/32*    (2006.01)
*G06F 1/14*    (2006.01)

(52) U.S. Cl.
CPC .............. *G06F 1/3296* (2013.01); *G06F 1/14* (2013.01); *G06F 1/3206* (2013.01);
(Continued)

(58) Field of Classification Search
CPC .......................... G06F 11/0721; G06F 11/0757
See application file for complete search history.

(56) References Cited

U.S. PATENT DOCUMENTS

| | | | | |
|---|---|---|---|---|
| 6,219,598 | B1 * | 4/2001 | Miwa | H02J 1/14 340/438 |
| 2005/0223244 | A1 * | 10/2005 | Sinai | G06F 1/32 713/300 |
| 2013/0198539 | A1 * | 8/2013 | Furuya | G06F 1/24 713/310 |

FOREIGN PATENT DOCUMENTS

| | | |
|---|---|---|
| JP | H10207859 A | 8/1998 |
| JP | H11203173 A | 7/1999 |

(Continued)

OTHER PUBLICATIONS

Jul. 4, 2017, Notification of Reasons for Refusal issued by the Japan Patent Office in the corresponding Japanese Patent Application No. 2014-012318, with English language Concise Explanation.

(Continued)

*Primary Examiner* — Albert Wang
(74) *Attorney, Agent, or Firm* — Kenja IP Law PC (57) ABSTRACT

A control apparatus and control method for a processor can reset the processor when the processor returns from low current consumption operation mode to regular operation mode. The control apparatus (11) for a processor (10) includes a watchdog timer (20) that resets the processor (10) when a P-RUN signal from the processor (10) cannot be acquired for a predetermined time, a current monitor (19) that suspends operation of the watchdog timer (20) when output current of a power supply (18) that supplies power to the processor (10) falls below a predetermined value and starts operation of the watchdog timer (20) when the output current becomes equal to or greater than the predetermined value, and a current amplifier (21) that increases the output (Continued)

current to be equal to or greater than the predetermined value upon acquiring a signal for causing the processor (10) to start operating in the regular operation mode.

3 Claims, 6 Drawing Sheets

(52) U.S. Cl.
CPC ........ *G06F 1/3228* (2013.01); *G06F 11/0721* (2013.01); *G06F 11/0757* (2013.01)

(56) References Cited

FOREIGN PATENT DOCUMENTS

| | | | |
|---|---|---|---|
| JP | 2005293077 | A | 10/2005 |
| JP | 2008217105 | A | 9/2008 |
| JP | 2012118686 | A | 6/2012 |

OTHER PUBLICATIONS

Jan. 27, 2015, International Search Report issued in the International Patent Application No. PCT/JP2014/005974.

\* cited by examiner

PROCESSOR CONTROL APPARATUS AND PROCESSOR CONTROL METHOD

CROSS-REFERENCE TO RELATED APPLICATION

This application claims priority to and the benefit of Japanese Patent Application No. 2014-012318 filed Jan. 27, 2014, the entire contents of which are incorporated herein by reference.

TECHNICAL FIELD

This disclosure relates to a control apparatus and control method that reset a processor.

BACKGROUND

Conventionally known watchdog timers monitor the operation of a processor, such as a CPU, and reset the processor for example when the processor is in a runaway or frozen state. For example, JP H11-203173 A (PTL 1) discloses a watchdog timer circuit that causes a watchdog timer to operate only when the processor is in an operation mode (regular operation mode) and not during another standby mode (low current consumption operation mode).

CITATION LIST

Patent Literature

PTL 1: JP H11-203173 A

SUMMARY

Technical Problem

With a conventional technique, however, the watchdog function is suspended during operation at low current consumption. Therefore, in some cases it is impossible to return to regular operation mode from low current consumption operation mode. For example, if the processor enters a runaway state during operation at low current consumption, the watchdog function does not operate, and the processor cannot switch to regular operation mode. In this way, when returning from low current consumption operation mode to regular operation mode, the CPU cannot be reset in some cases.

It would therefore be helpful to provide a processor control apparatus and processor control method that can reset the processor when the processor returns from low current consumption operation mode to regular operation mode.

Solution to Problem

In order to resolve the aforementioned problem, a processor control apparatus according to a first aspect of this disclosure is a processor control apparatus for controlling a processor capable of operating while switching between a regular operation mode and a low current consumption operation mode with a lower current consumption than the regular operation mode, the processor control apparatus including:

a watchdog timer configured to reset the processor when a P-RUN signal from the processor cannot be acquired for a predetermined time;

a current monitor configured to suspend operation of the watchdog timer when output current of a power supply that supplies power to the processor falls below a predetermined value and to start operation of the watchdog timer when the output current becomes equal to or greater than the predetermined value; and a current amplifier configured to increase the output current to be equal to or greater than the predetermined value upon acquiring a signal for causing the processor to start operating in the regular operation mode.

A processor control apparatus according to a second aspect of this disclosure further includes a P-RUN signal detector configured to reduce or remove an increase by the current amplifier in the output current upon detecting input of the P-RUN signal.

A processor control method according to a third aspect of this disclosure is a processor control method used in a control apparatus that includes a watchdog timer configured to reset a processor when a P-RUN signal from the processor cannot be acquired for a predetermined time, the processor being capable of operating while switching between a regular operation mode and a low current consumption operation mode with a lower current consumption than the regular operation mode, the processor control method including:

suspending operation of the watchdog timer when output current of a power supply that supplies power to the processor falls below a predetermined value;

increasing the output current to be equal to or greater than the predetermined value upon acquiring a signal for causing the processor to start operating in the regular operation mode; and starting operation of the watchdog timer when the output current becomes equal to or greater than the predetermined value.

Advantageous Effect

The processor control apparatus according to the first aspect of this disclosure can reset the processor by starting operation of the watchdog timer when the processor returns from low current consumption operation mode to regular operation mode. Power consumption of the control apparatus can also be reduced, since operation of the watchdog timer is suspended when the processor operates at low current consumption.

The processor control apparatus according to the second aspect of this disclosure reduces or removes an increase by the current amplifier in the output current of the power supply after the processor returns from low current consumption operation mode to regular operation mode and can therefore further reduce the power consumption of the control apparatus.

The processor control method according to the third aspect of this disclosure can reset the processor by starting operation of the watchdog timer when the processor returns from low current consumption operation mode to regular operation mode. Power consumption of the control apparatus can also be reduced, since operation of the watchdog timer is suspended when the processor operates at low current consumption.

DETAILED DESCRIPTION

The following describes embodiments with reference to the drawings.

Embodiment 1

Figure 1:
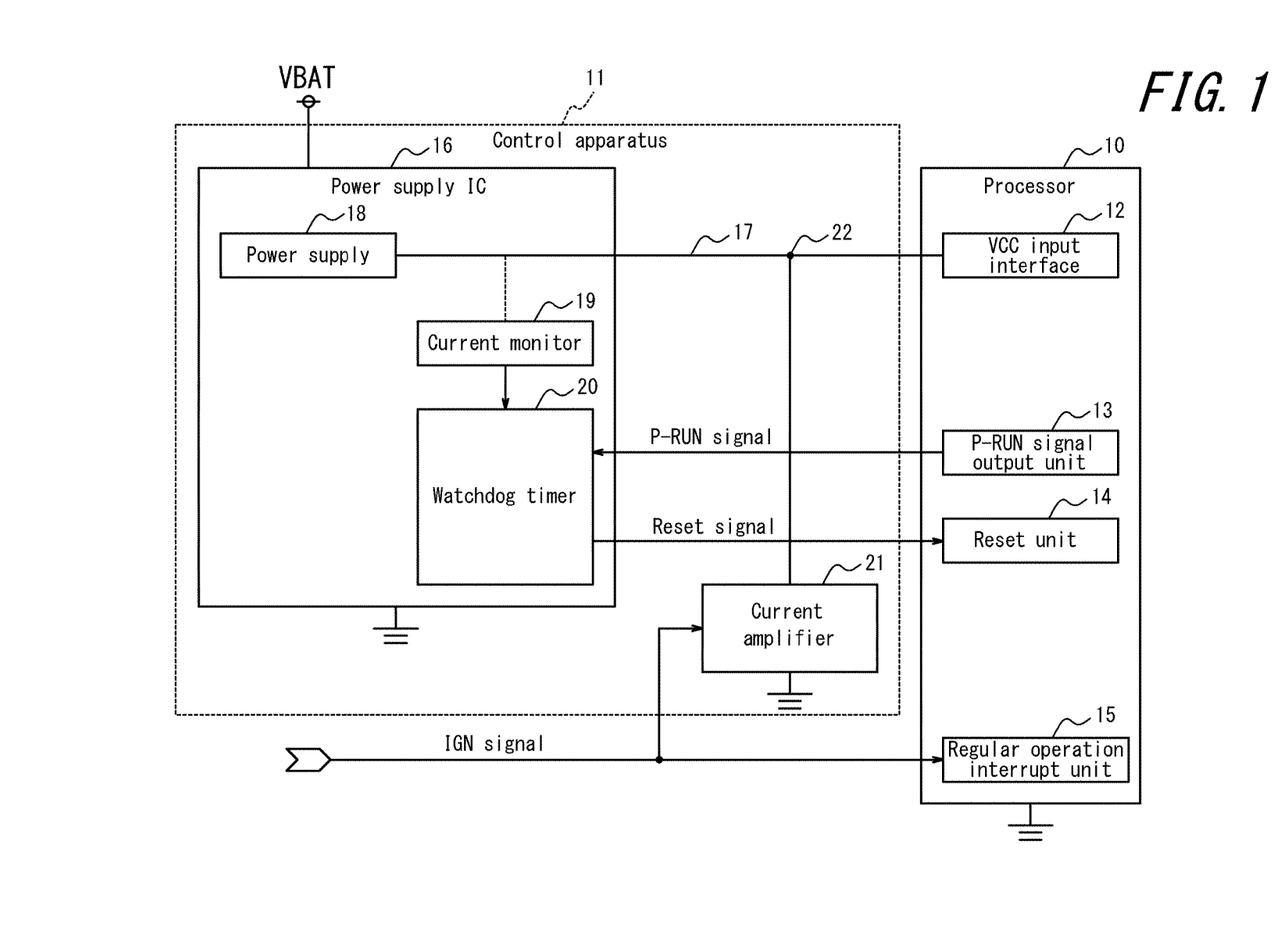
FIG. 1 is a functional block diagram of a control apparatus, according to Embodiment 1 of this disclosure, connected to a processor.

First, a control apparatus according to Embodiment 1 is described. FIG. 1 is a functional block diagram of a processor 10 and of a control apparatus 11 according to Embodiment 1. The processor 10 and the control apparatus 11 are for example provided in a moving vehicle, such as an electric car. The processor 10 can switch between two operation modes: a regular operation mode in which a variety of functions can be executed, and a low current consumption operation mode (standby mode) in which executable functions are restricted and current consumption is reduced.

The processor 10 includes a VCC input interface 12, a P-RUN signal output unit 13, a reset unit 14, and a regular operation interrupt unit 15.

The VCC input interface 12 is connected to a power supply IC 16 by a power line 17 and receives supply of operating power for the processor 10 from the power supply IC 16. The VCC input interface 12 receives a current supply of a predetermined value or higher during the regular operation mode of the processor 10 and receives current supply of less than the predetermined value during the low current consumption operation mode of the processor 10.

During regular operation of the processor 10, the P-RUN signal output unit 13 continuously outputs a P-RUN signal (oscillating signal) to the power supply IC 16. The P-RUN signal is a signal indicating that the processor 10 is operating normally. In this embodiment, the P-RUN signal is for example a pulse signal having a predetermined period and duty cycle, but this example is not limiting. Hereinafter, the P-RUN signal is referred to as being ON when the P-RUN signal is being output and being OFF when not being output.

The reset unit 14 resets the processor 10 upon a reset signal being input from the power supply IC 16. By a reset, the processor 10 returns from an abnormal state, such as a frozen or runaway state in which the processor 10 does not operate normally, to a state in which normal operation is possible.

The regular operation interrupt unit 15 stands by for input of an IGN signal. Upon input of an IGN signal, the regular operation interrupt unit 15 causes the processor 10 to start operating in the regular operation mode. The IGN signal is an interrupt signal for causing the processor 10 to start operating in the regular operation mode and for example is output by a moving vehicle, or another constituent element provided in the moving vehicle, when the moving vehicle's power switch is turned ON. For example, upon input of the IGN signal to the regular operation interrupt unit 15 while the processor 10 is operating at low current consumption, the processor 10 returns from low current consumption operation mode to regular operation mode. On the other hand, for example when the processor 10 enters an abnormal state during operation at low current consumption, then unless the processor 10 is reset by the reset unit 14, the processor 10 cannot return to a state in which normal operation is possible even if the IGN signal is input to the regular operation interrupt unit 15 and cannot return to regular operation mode. Hereinafter, the IGN signal is referred to as being ON when the IGN signal is being output and being OFF when not being output.

The control apparatus 11 is provided with the power supply IC 16 and a current amplifier 21. The power supply IC 16 includes a power supply 18, a current monitor 19, and a watchdog timer 20 and operates by supply of power VBAT from an external power supply apparatus, such as a battery provided in the moving vehicle.

The power supply 18 is connected to the VCC input interface 12 of the processor 10 by the power line 17 and supplies operating power for the processor 10.

The current monitor 19 monitors the output current (load current) of the power supply 18. The current monitor 19 determines that the processor 10 has switched from regular operation mode to low current consumption operation mode when the output current of the power supply 18 falls below a predetermined value and suspends operation of the watchdog timer 20. The current monitor 19 starts operation of the watchdog timer 20 when the output current of the power supply 18 becomes equal to or greater than the predetermined value.

The watchdog timer 20 outputs a reset signal to reset the processor 10 when the P-RUN signal cannot be acquired from the processor 10 for a predetermined time. In addition to when the P-RUN signal cannot be acquired, the watchdog timer 20 also outputs a reset signal similarly when an abnormal P-RUN signal with a disordered period or duty cycle is acquired. Hereinafter, the watchdog timer 20 is referred to as being ON when the watchdog timer 20 is operating and being OFF when not operating.

The current amplifier 21 stands by for input of an IGN signal. The current amplifier 21 has a current amplification function to increase the output current of the power supply 18 to be equal to or greater than the predetermined value upon acquiring the IGN signal. For example, the current amplifier 21 includes a first transistor that has a base into which the IGN signal is input, a collector connected to a node 22 on the power line 17, and a grounded emitter. The current amplifier 21 increases the output current of the power supply 18 by drawing the output current of the power supply 18 in response to input of the IGN signal. The current amplifier 21 for example includes a resistor for current adjustment between the power supply 18 and the collector. Therefore, the increased output current is adjusted to be the predetermined value or higher. Hereinafter, the current amplification function of the current amplifier 21 is referred to as being ON when the current amplification function is operating and being OFF when not operating.

Next, the input/output signals and operations of the processor 10 and control apparatus 11 are described with reference to the timing chart in FIG. 2. The following describes the case of the processor 10 operating at low current consumption and entering an abnormal state (for example, freezing) during operation at low current consumption.

Figure 2:
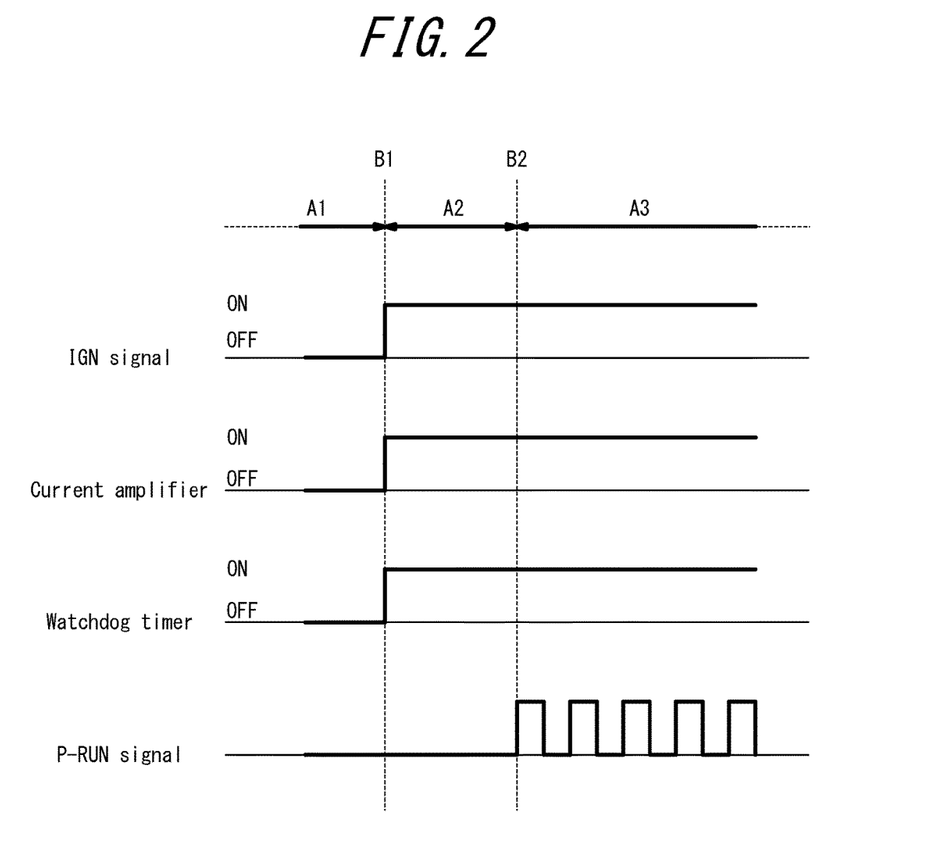
FIG. 2 is a timing chart illustrating the input/output signals and operations of the processor and control apparatus of FIG. 1.

As illustrated in FIG. 2, during the time period A1, the IGN signal, the current amplification function of the current amplifier 21, operation of the watchdog timer 20, and the P-RUN signal are each OFF.

At time B1 after the time period A1, once the IGN signal turns ON, the IGN signal is input to the current amplifier 21, and the current amplification function of the current amplifier 21 turns ON. Since the output current of the power supply 18 becomes the predetermined value or higher due to the current amplifier 21, the current monitor 19 switches operation of the watchdog timer 20 ON.

During the time period A2 after the time B1, the processor 10 cannot return to the regular operation mode as a result of freezing, and the P-RUN signal remains OFF. The watchdog timer 20 outputs a reset signal to reset the processor 10 once a predetermined length of time elapses after the time B1.

At time B2 after the time period A2, once the processor 10 that has returned to normal operation by the reset starts operating in the regular operation mode, the P-RUN signal output unit 13 begins output of the P-RUN signal.

During the time period A3 after the time B2, the processor 10 continues regular operation.

Figure 3:
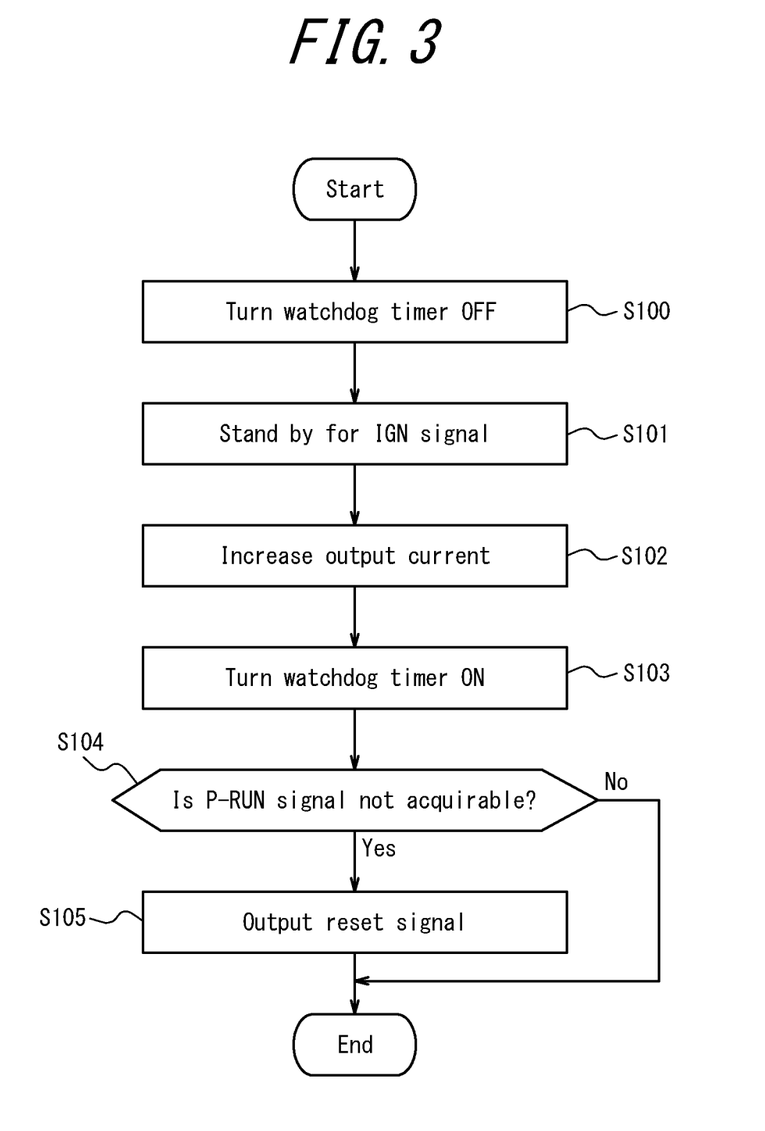
FIG. 3 is a flowchart illustrating processing by the control apparatus of FIG. 1.

Next, processing by the control apparatus 11 from the start of the low current consumption operation mode of the processor 10 until the processor 10 returns to regular operation mode is described with reference to the flowchart in FIG. 3. This processing is executed for example when the processor 10 starts operating in the low current consumption operation mode.

First, since the output current of the power supply 18 falls below the predetermined level due to the start of the low current consumption operation mode of the processor 10, the power supply monitor suspends (turns OFF) operation of the watchdog timer 20 (step S100).

Next, the current amplifier 21 stands by for input of the IGN signal (step S101).

Subsequently, upon acquiring the IGN signal, the current amplifier 21 starts (turns ON) operation of the current amplification function and increases the output current of the power supply 18 to be equal to or greater than the predetermined value (step S102).

Next, since the output current of the power supply 18 became equal to or greater than the predetermined value in step S102, the current monitor 19 starts (turns ON) operation of the watchdog timer 20 (step S103).

Subsequently, the watchdog timer 20 determines whether a normal P-RUN signal from the processor 10 cannot be acquired for a predetermined time (step S104). When the P-RUN signal can be acquired (step S104: No), processing terminates.

Conversely, when the P-RUN signal cannot be acquired in step S104 (step S104: Yes), the watchdog timer 20 outputs a reset signal to the processor 10 (step S105) and terminates processing.

The control apparatus 11 according to Embodiment 1 can, as described below, reset the processor 10 by starting operation of the watchdog timer 20 when the processor 10 returns from low current consumption operation mode to regular operation mode.

Once the processor 10 starts operating in the low current consumption operation mode, the output current of the power supply 18 reduces. Therefore, the power supply monitor suspends operation of the watchdog timer 20. Suspension of operation of the watchdog timer 20 is preferable for reducing power consumption of the control apparatus 11.

For example, if the processor 10 enters an abnormal state during operation at low current consumption, the processor 10 cannot return to the regular operation mode unless it is reset, even if the IGN signal is input into the regular operation interrupt unit 15. On the other hand, since the output current supplied from the power supply 18 to the processor 10 during operation at low current consumption is less than the predetermined level, operation of the watchdog timer 20 remains suspended by the current monitor 19.

Upon the IGN signal being input into the current amplifier 21, the output current of the power supply 18 is increased to be equal to or greater than the predetermined value. Therefore, the current monitor 19 starts operation of the watchdog timer 20. The watchdog timer 20 outputs the reset signal to reset the processor 10, and the processor 10 starts normal operation.

As described above, the control apparatus 11 can reset the processor 10 when the processor 10 has entered an abnormal state during operation at low current consumption, since operation of the watchdog timer 20 begins in response to input of the IGN signal to the current amplifier 21. Power consumption of the control apparatus 11 can also be reduced, since operation of the watchdog timer 20 is suspended when the processor 10 operates at low current consumption.

Embodiment 2

Figure 4:
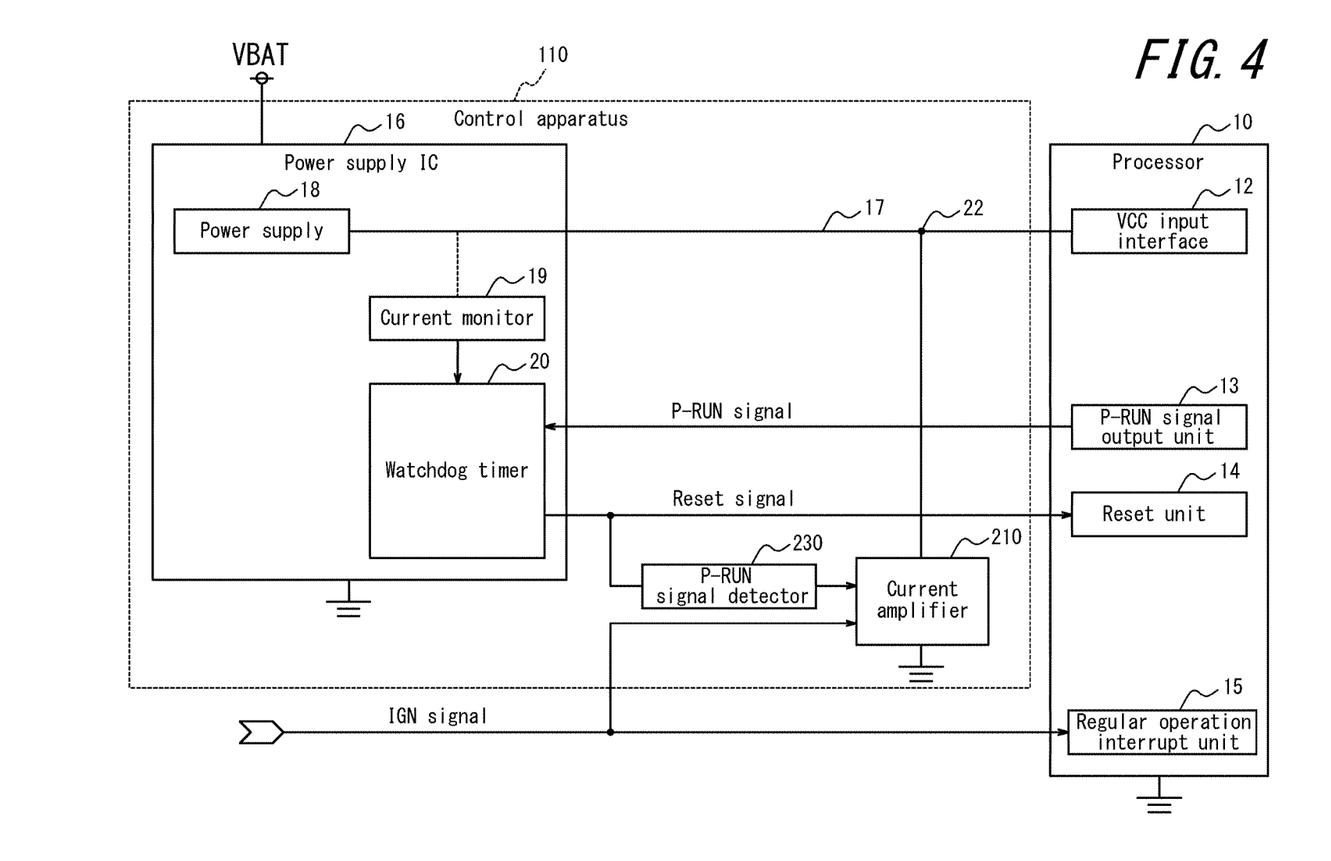
FIG. 4 is a functional block diagram of a control apparatus, according to Embodiment 2 of this disclosure, connected to a processor.

Next, a control apparatus according to Embodiment 2 is described. FIG. 4 is a functional block diagram of a processor 10 and of a control apparatus 110 according to Embodiment 2. The processor 10 is the same as in Embodiment 1.

The control apparatus 110 is provided with a power supply IC 16, a current amplifier 210, and a P-RUN signal detector 230. The power supply IC 16 includes a power supply 18, a current monitor 19, and a watchdog timer 20, which are the same as in Embodiment 1.

As in Embodiment 1, the current amplifier 210 has a current amplification function to increase the output current of the power supply 18 to be equal to or greater than the predetermined value upon acquiring the IGN signal. The operation of the current amplification function of the current amplifier 210 is controlled by a signal input from the P-RUN signal detector 230. In greater detail, while a signal (current amplifier control signal) from the P-RUN signal detector 230 is being input, the current amplifier 210 for example continues to draw output current of the power supply 18 and maintains the increase due to the current amplification function in the output current of the power supply 18. Conversely, when input of the current amplifier control signal is suspended, the current amplifier 210 for example stops drawing the output current of the power supply 18, thereby reducing the output current of the power supply 18. For example, the current amplifier 210 includes a second transistor between the node 22 on the power line 17 and the collector of the first transistor. In the second transistor, the base is connected to the P-RUN signal detector 230, the collector is connected to the node 22, and the emitter is connected to the collector of the first transistor. By turning the second transistor OFF in response to suspension of input of the current amplifier control signal, the current amplifier 210 disconnects itself from the power supply 18 and stops drawing the output current of the power supply 18.

The P-RUN signal detector 230 monitors whether there is input of the P-RUN signal from the P-RUN signal output unit 13 of the processor 10. Upon detecting input of the P-RUN signal, the P-RUN signal detector 230 causes the current amplifier 210 to suspend operation, thereby reducing or removing the increase by the current amplifier 210 in the output current of the power supply 18. In this embodiment, while the P-RUN signal is not being input, the P-RUN signal detector 230 continues to output a signal (current amplifier control signal) to the current amplifier 210 to cause the current amplifier 210 to maintain the increased output current of the power supply 18. Upon detecting input of the P-RUN signal, the P-RUN signal detector 230 suspends output of the current amplifier control signal to the current amplifier 210 and for example causes the current amplifier 210 to stop drawing the output current of the power supply 18, thereby removing the increase by the current amplifier 210 in the output current of the power supply 18. Hereinafter, the current amplifier control signal is referred to as being ON when the current amplifier control signal is being output and being OFF when not being output.

Next, the input/output signals and operations of the processor 10 and control apparatus 110 are described with reference to the timing chart in FIG. 5. The following describes the case of the processor 10 operating at low current consumption and entering an abnormal state (for example, freezing) during operation at low current consumption.

Figure 5:
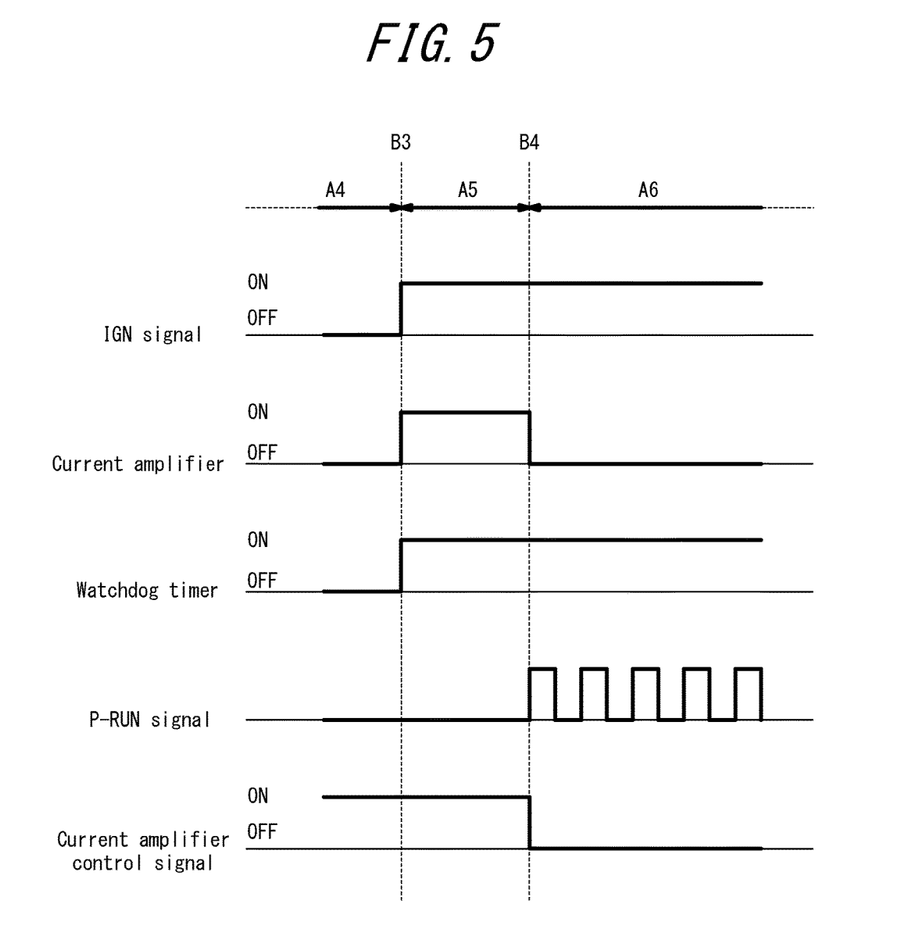
FIG. 5 is a timing chart illustrating the input/output signals and operations of the processor and control apparatus of FIG. 4.

As illustrated in FIG. 5, during the time period A4, the IGN signal, the current amplification function of the current amplifier 210, operation of the watchdog timer 20, and the P-RUN signal are each OFF. Since the P-RUN signal is OFF, however, the current amplifier control signal is ON.

At time B3 after the time period A4, once the IGN signal turns ON, the IGN signal is input to the current amplifier 210, and the current amplification function of the current amplifier 210 turns ON. Since the output current of the power supply 18 becomes the predetermined value or higher due to the current amplifier 210, the current monitor 19 turns operation of the watchdog timer 20 ON.

During the time period A5 after the time B3, the processor 10 cannot return to regular operation mode as a result of freezing, and the P-RUN signal remains OFF. The watchdog timer 20 outputs a reset signal to reset the processor 10 once a predetermined length of time elapses after the time B3.

At time B4 after the time period A5, once the processor 10 that has returned to normal operation by the reset starts operating in the regular operation mode, the P-RUN signal output unit 13 begins output of the P-RUN signal. The P-RUN signal detector 230 detects input of the P-RUN signal and therefore switches the current amplifier control signal to OFF to turn the current amplification function of the current amplifier 210 OFF.

During the time period A6 after the time B4, the processor 10 continues regular operation.

Figure 6:
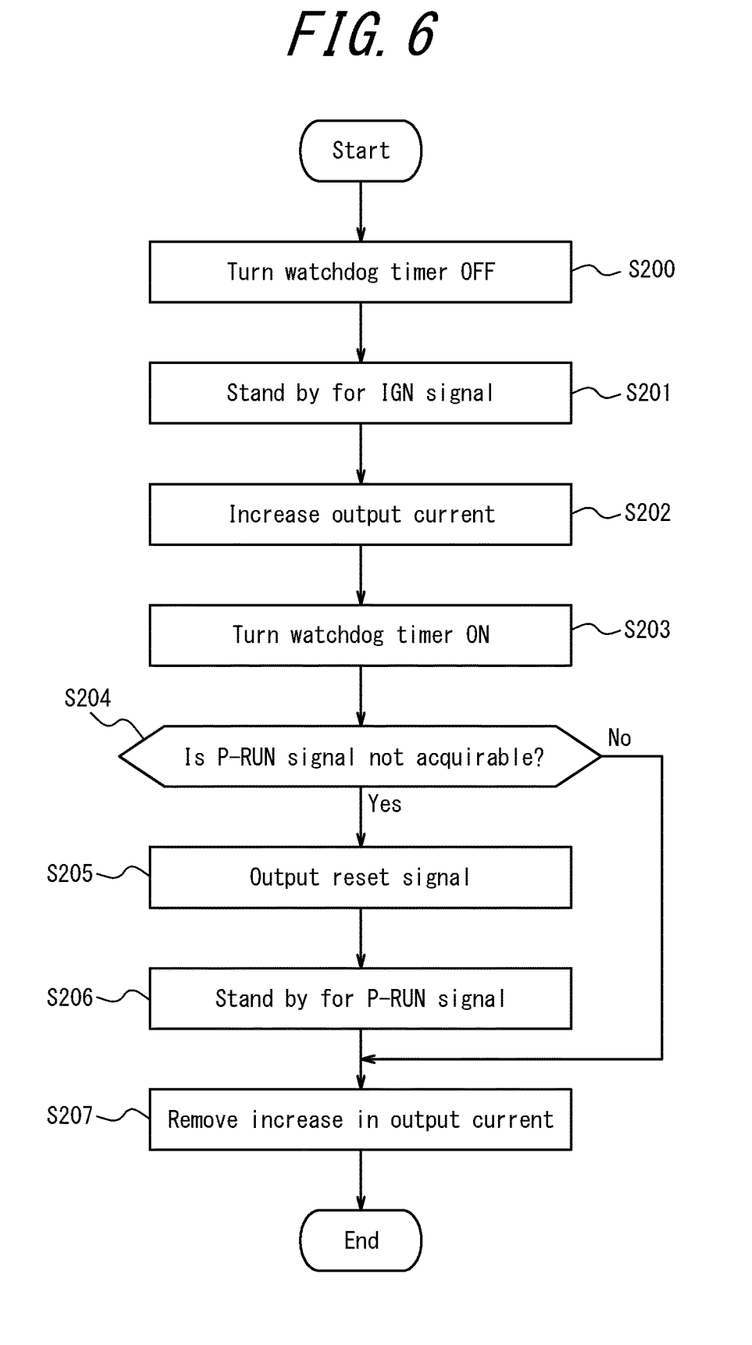
FIG. 6 is a flowchart illustrating processing by the control apparatus of FIG. 4.

Next, processing by the control apparatus 110 from the start of the low current consumption operation mode of the processor 10 until the processor 10 returns to regular operation mode is described with reference to the flowchart in FIG. 6. This processing is executed for example when the processor 10 starts operating in the low current consumption operation mode.

From step S200 to step S203, the same processing as in step S100 to step S103 in Embodiment 1 is executed.

Subsequently, the watchdog timer 20 determines whether a normal P-RUN signal from the processor 10 cannot be acquired for a predetermined time (step S204). When the P-RUN signal can be acquired (step S204: No), processing proceeds to step S207.

Conversely, when the P-RUN signal cannot be acquired in step S204 (step S204: Yes), the watchdog timer 20 outputs a reset signal to the processor 10 (step S205).

Next, the P-RUN signal detector 230 stands by for input of the P-RUN signal from the processor 10 (step S206).

After step S206, or when the P-RUN signal can be acquired in step S204 (step S204: No), the P-RUN signal detector 230 suspends (turns OFF) output of the current amplifier control signal upon detecting input of the P-RUN signal, thereby causing operation of the current amplification function of the current amplifier 210 to be suspended (turned OFF). As a result, the increase due to the current amplifier 210 in the output current of the power supply 18 is removed (step S207).

In this way, with the control apparatus 110 according to Embodiment 2, the increase due to the current amplifier 210 in the output current of the power supply 18 is reduced or removed after the processor 10 returns from low current consumption operation mode to regular operation mode. Hence, the power consumption of the control apparatus 110 can be further reduced.

Although embodiments of this disclosure have been described based on examples and on the accompanying drawings, it is to be noted that various changes and modifications will be apparent to those skilled in the art based on this disclosure. Therefore, such changes and modifications are to be understood as included within the scope of this disclosure. For example, the functions and the like included in the units, steps, and the like may be reordered in any logically coherent way. Furthermore, units, steps, and the like may be combined into one or divided.

For example, in the above-described embodiments, operation of the watchdog timer 20 has been described as being started or suspended in response to the output current of the power supply 18, but operation of the watchdog timer 20 may for example be controlled using another parameter, such as the output voltage of the power supply 18. This configuration may for example be implemented by the control apparatuses 11 and 110 including, instead of the current amplifiers 21 and 210, a voltage controller that controls the output voltage of the power supply 18 in response to operation of the processor 10.

In the above-described embodiments, the current amplifiers 21 and 210 have been described as including a first transistor or first and second transistors, but any structure may be adopted to increase the output current of the power supply 18 to be equal to or greater than the predetermined value in response to input of the IGN signal.

In Embodiment 2, a structure has been described in which the P-RUN signal detector 230 outputs the current amplifier control signal to remove the increase due to the current amplifier 210 in the output current of the power supply 18, but any structure may be adopted that can at least reduce the increase due to the current amplifier 210 in the output current of the power supply 18 in response to input of the P-RUN signal. For example, the P-RUN signal detector 230 may include a variable resistor or a transistor connected between the current amplifier 210 and the node 22 on the power line 17 and be configured to increase the resistance of the variable resistor or turn the transistor off upon detecting input of the P-RUN signal.

REFERENCE SIGNS LIST

10 Processor
11, 110 Control apparatus
12 VCC input interface

13 P-RUN signal output unit
14 Reset unit
15 Regular operation interrupt unit
16 Power supply IC
17 Power line
18 Power supply
19 Current monitor
20 Watchdog timer
21, 210 Current amplifier
22 Node
230 P-RUN signal detector

The invention claimed is:

1. A processor control apparatus for controlling a processor capable of operating while switching between a regular operation mode and a low current consumption operation mode with a lower current consumption than the regular operation mode, the processor control apparatus comprising:
   a watchdog timer configured to reset the processor when a P-RUN signal from the processor cannot be acquired for a predetermined time;
   a current monitor configured to suspend operation of the watchdog timer when output current of a power supply that supplies power to the processor falls below a predetermined value and to start operation of the watchdog timer when the output current becomes equal to or greater than the predetermined value; and
   a current amplifier configured to increase the output current to be equal to or greater than the predetermined value upon acquiring a signal for causing the processor to start operating in the regular operation mode.

2. The processor control apparatus of claim 1, further comprising:
   a P-RUN signal detector configured to reduce or remove an increase by the current amplifier in the output current upon detecting input of the P-RUN signal.

3. A processor control method used in a control apparatus that includes a watchdog timer configured to reset a processor when a P-RUN signal from the processor cannot be acquired for a predetermined time, the processor being capable of operating while switching between a regular operation mode and a low current consumption operation mode with a lower current consumption than the regular operation mode, the processor control method comprising:
   suspending operation of the watchdog timer when output current of a power supply that supplies power to the processor falls below a predetermined value;
   increasing the output current to be equal to or greater than the predetermined value upon acquiring a signal for causing the processor to start operating in the regular operation mode; and
   starting operation of the watchdog timer when the output current becomes equal to or greater than the predetermined value.

\* \* \* \* \*